US008762374B1

(12) United States Patent
Chen et al.

(10) Patent No.: US 8,762,374 B1
(45) Date of Patent: Jun. 24, 2014

(54) TASK DRIVEN CONTEXT-AWARE SEARCH

(75) Inventors: Jidong Chen, Beijing (CN); Hang Guo, Beijing (CN); David Stephen Reiner, Lexington, MA (US)

(73) Assignee: EMC Corporation, Hopkinton, MA (US)

(*) Notice: Subject to any disclaimer, the term of this patent is extended or adjusted under 35 U.S.C. 154(b) by 331 days.

(21) Appl. No.: 12/751,405

(22) Filed: Mar. 31, 2010

Related U.S. Application Data

(60) Provisional application No. 61/311,653, filed on Mar. 8, 2010.

(51) Int. Cl.
*G06F 17/30* (2006.01)
(52) U.S. Cl.
USPC .......................................................... 707/733
(58) Field of Classification Search
CPC ..................... G06F 17/30522; G06F 17/30528
See application file for complete search history.

(56) References Cited

U.S. PATENT DOCUMENTS

| | | | |
|---|---|---|---|
| 2002/0169764 A1* | 11/2002 | Kincaid et al. ................ | 707/3 |
| 2007/0112730 A1* | 5/2007 | Gulli et al. ................... | 707/3 |
| 2008/0005068 A1 | 1/2008 | Dumais et al. | |
| 2008/0005313 A1 | 1/2008 | Flake et al. | |
| 2008/0195586 A1 | 8/2008 | Arnold et al. | |
| 2009/0049010 A1* | 2/2009 | Bodapati ...................... | 707/3 |
| 2009/0164395 A1* | 6/2009 | Heck ............................. | 706/16 |
| 2010/0131443 A1* | 5/2010 | Agarwal et al. .............. | 706/46 |
| 2010/0205541 A1* | 8/2010 | Rapaport et al. .............. | 715/753 |
| 2011/0022476 A1* | 1/2011 | Barkley et al. ............... | 705/14.66 |
| 2011/0208730 A1* | 8/2011 | Jiang et al. ................... | 707/727 |

FOREIGN PATENT DOCUMENTS

| | | |
|---|---|---|
| EP | 1050830 A2 | 8/2000 |
| GB | 2434230 A | 7/2007 |
| WO | 2007/064639 A2 | 6/2007 |
| WO | 2007/130716 A2 | 11/2007 |
| WO | 2009/138755 A1 | 11/2009 |

OTHER PUBLICATIONS

Cao et al. Towards Context-Aware Search by Learning a very Large Variable Length Hidden Markov Model from Search Logs, Published Apr. 20, 2009.*

(Continued)

*Primary Examiner* — Kevin L Young
(74) *Attorney, Agent, or Firm* — Ryan, Mason & Lewis, LLP

(57) ABSTRACT

A processing device of an information processing system is configured to detect bursts of activity associated with a particular user, to map the bursts to tasks performed by the user, to generate a user model based on the mapping of bursts to tasks, and to provide personalized query processing to the user based on the user model. The user model may comprise a Hidden Markov Model. In one embodiment, a query is received from the user in a current time window, and a model parameter is obtained. Based on the model parameter, a most likely task for the user in the current time window is identified, and based on the query, the most likely task, and user classification, search results are ranked for presentation to the user. The processing device may be configured to communicate the user model to a cloud service provider, and to receive from the cloud service provider the ranked search results determined based on the user model.

23 Claims, 5 Drawing Sheets

(56) References Cited

OTHER PUBLICATIONS

Shen et al. A Hybrid Learning System for Recognizing User Tasks from Desktop Activities and Email Messages, IUI '06 Proceedings of the 11th international conference on Intelligent user interfaces, Feb. 1, 2006.*

Yuan et al., Online Burst Detection Over High Speed Short Text Streams, published Computational Science—ICCS 2007, http://link.springer.com/chapter/10.1007/978-3-540-72588-6_119.*

Klienberg, Bursty and Hierarchical Structure in Streams, published in Data mining and Knowledge Discovery 2003 http://link.springer.com/article/10.1023/A:1024940629314.*

Rabiner, A tutorial on hidden Markov models and selected applications in speech recognition, Published by IEEE 1989 http://ieeexplore.ieee.org/xpls/abs_all.jsp?arnumber=18626&tag=1.*

J. Chen et al., "Search Your Memory!—An Associative Memory Based Desktop Search System," Proceedings of the 35th SIGMOD International Conference on Management of Data, Jun. 29-Jul. 2, 2009, pp. 1099-1102, Providence, Rhode Island, USA.

H. Guo et al., "Personalization as a Service: the Architecture and a Case Study," Proceedings of the First International Workshop on Cloud Data Management, Nov. 2, 2009, pp. 1-8, Hong Kong, China.

H. Cao et al., "Towards Context-Aware Search by Learning a Very Large Variable Length Hidden Markov Model from Search Logs," International World Wide Web Conference Committee, Apr. 20-24, 2009, pp. 191-200, Madrid, Spain.

U.S. Appl. No. 12/629,952, filed in the name of J. Chen et al. on Dec. 3, 2009 and entitled "Associative Memory Based Desktop Search Technology."

* cited by examiner

BUILDING USER MODEL

USING USER MODEL

TASK DRIVEN CONTEXT-AWARE SEARCH

RELATED APPLICATION

The present application claims the priority of U.S. Provisional Patent Application Ser. No. 61/311,653, filed Mar. 8, 2010 and entitled "Task Driven Context-Aware Search," which is incorporated by reference herein.

FIELD OF THE INVENTION

The present invention relates generally to the field of information processing, and more particularly to techniques for processing user search queries in conjunction with computer-based searches for information.

BACKGROUND OF THE INVENTION

Two important categories of computer-based searching are desktop search and web search. In desktop search, users search their personal desktop resources primarily for files they know exist but for which they have forgotten the exact storage locations and keywords. The search queries in this case are often referred to as "known item" search queries. Conventional desktop search systems such as Google Desktop, Microsoft Windows Desktop Search, and Apple Spotlight typically only support keyword searches that rank results by their relevance to the query. These desktop search systems generally do not consider user preferences, and personalized results are typically not provided. Most conventional web search systems also do not distinguish between different users, and instead rank search results according to the preferences of most users.

The "known item" search queries of desktop search can benefit from the use of a highly personalized search engine. See, for example, J. Chen et al., "Search your memory—an associative memory based desktop search system," Proceedings of the 35$^{th}$ SIGMOD International Conference on Management of Data, Providence, R.I., USA, Jun. 29-Jul. 2, 2009, which is incorporated by reference herein. Techniques disclosed in this reference exploit semantic associations among resources by analyzing user activities to simulate human associative memory, and provide a personalized ranking scheme that utilizes these links, together with user personal preferences, to rank results by both relevance and importance.

Recently, web search systems have begun to model query contexts by mining searches or browsing logs (e.g. clickthrough data) in an attempt to personalize the search results. However, because such systems typically only consider query strings and simple clickthrough data, they fail to provide adequate personalization of the search.

SUMMARY OF THE INVENTION

Illustrative embodiments of the present invention provide improved search systems in which task driven user models are generated in a particularly accurate and efficient manner, thereby ensuring better personalization of search results in desktop search, web search and other categories of computer-based search.

In one aspect of the invention, a processing device of an information processing system is configured to detect bursts of activity associated with a particular user, to map the bursts to tasks performed by the user, to generate a user model based on the mapping of bursts to tasks, and to provide personalized query processing to the user based on the user model. The personalized query processing may involve determining how to process a query, or ranking search results for presentation to the user. By way of example, a query may be received from the user in a current time window, and a model parameter is obtained. Based on the model parameter, a most likely task for the user in the current time window is identified, and based the query, the most likely task, and user classification, search results are ranked for presentation to the user. The model parameter may be determined as a model parameter that best fits an observed activity log from a previous time window.

In another aspect of the invention, the processing device may be configured to communicate the user model to a cloud service provider, and to receive from the cloud service provider the ranked search results determined based on the user model.

In a further aspect of the invention, the processing device may be configured to generate one or more user classifications based on resources accessed by the user and the tasks performed by the user, and to provide personalized query processing to the user based on the user model and the one or more user classifications. For example, the processing device may be configured to route the query to a particular cloud service provider based on the one or more user classifications. Thus, there may be multiple classification schemes associated with particular users. A given classification may comprise an assignment of a single class name with respect to a corresponding classification scheme.

In a given one of the illustrative embodiments, the user model comprises a Hidden Markov Model. More specifically, the HMM may be of the form $\lambda=(T, R, \pi, A, B)$, in which T and R are sets of tasks and resources respectively, $\pi$ is an initial probability vector of tasks, A is a transformation matrix of tasks and B is an association matrix between tasks and resources.

The illustrative embodiments advantageously overcome the above-noted drawbacks of conventional approaches.

These and other features and advantages of the present invention will become more readily apparent from the accompanying drawings and the following detailed description.

DETAILED DESCRIPTION

The present invention will be described herein with reference to exemplary information processing systems and associated processing devices. It is to be appreciated, however, that the invention is not restricted to use with the particular illustrative system and device configurations shown. Moreover, the term "information processing system" as used herein is intended to be broadly construed, so as to encompass, for example, desktop systems or other personal computer systems, cloud systems, network systems, as well as other types of computer-based systems implementing personalized search functionality of the type disclosed herein.

Figure 1:
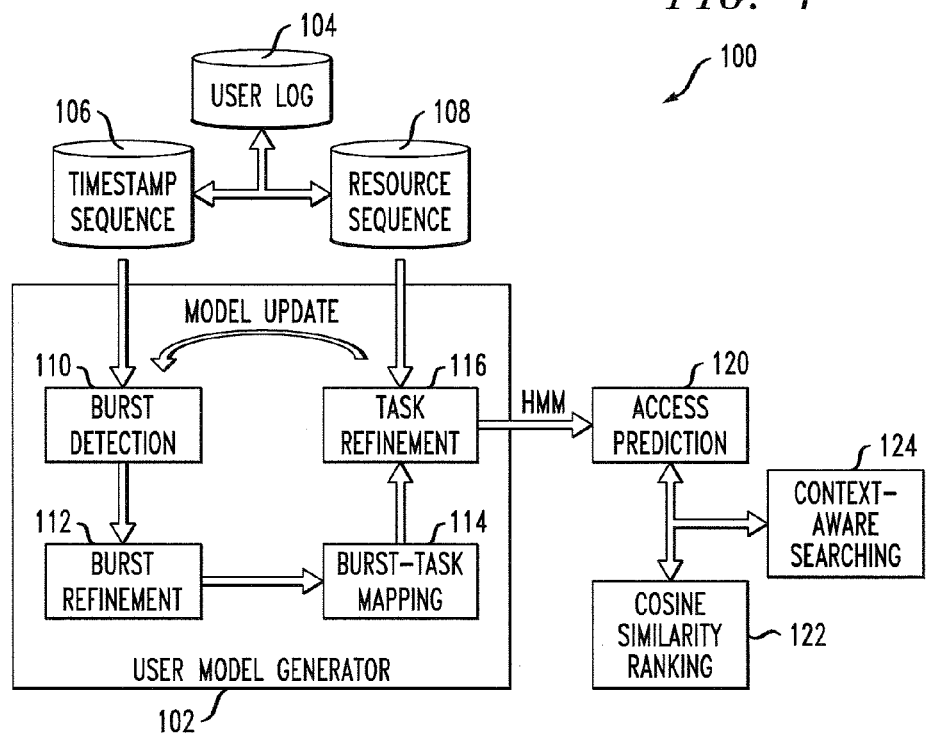
FIG. 1 is a block diagram showing a portion of an information processing system implementing context-aware search in an illustrative embodiment of the invention.

FIG. 1 shows a portion of an information processing system 100 that incorporates context-aware search in one embodiment of the invention. The portion of system 100 shown in the figure includes a user model generator 102 that is utilized to construct a context-aware user model, illustratively in the form of a Hidden Markov Model (HMM) characterizing the behavior of a user interacting with information on a desktop or other user terminal, such as how the user turns from one task to another, and how close each resource is to a given task. Although the present embodiment assumes a desktop search system, the disclosed techniques can be adapted to other categories of search, including web search.

In constructing the user model, the model generator 102 analyzes user activity logs stored in element 104 to discover the corresponding tasks. This is done in the present embodiment by separating the user activity logs into two parts, namely, a timestamp sequence and a resource sequence, which are stored in respective elements 106 and 108. The model is initialized by analyzing the pattern of access frequency for the user from the timestamp sequence. Then the model is optimized using the resource sequence. More specifically, there are four distinct operations applied in the model construction process: burst detection, burst refinement, burst-task mapping and task refinement. These operations are implemented in respective modules 110, 112, 114 and 116 of the model generator 102. The HMM generated by the model generator 102 in the present embodiment is applied to an access prediction module 120, which interacts with a cosine similarity ranking module 122. Both of the modules 120 and 122 interact with a context-aware searching interface 124.

Figure 2:
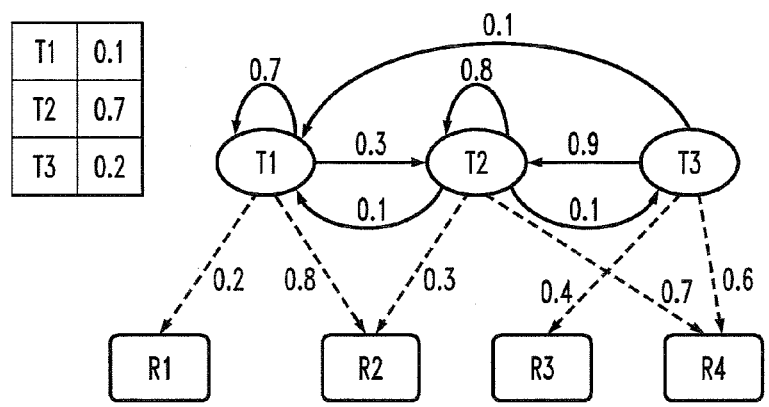
FIG. 2 shows an example of a user model generated in the FIG. 1 system.

An example of an HMM that may be generated by the model generator 102 is shown in FIG. 2. The user starts to work on one task (e.g., T1, T2 or T3) according to predefined probabilities given by the table in the figure. As a result, the user accesses a resource (e.g., R1, R2, R3 or R4) which is related to that task. The numbers on the dashed lines show the probabilities that the resources are related to the tasks. After completing one task the user transforms to another task. The numbers on the solid lines show the probabilities of the transformation from one task to another.

An HMM of the type shown in FIG. 2 can be formally represented as $\lambda=(T, R, \pi, A, B)$, in which T and R are sets of tasks and resources respectively, $\pi$ is an initial probability vector of tasks, A is a transformation matrix of tasks and B is an association matrix between tasks and resources. The HMM is initialized and optimized based on user activity logs as will be described in greater detail below. The user activity logs can be represented in at least two ways according to different activity tracking mechanisms.

One way to represent the user activity logs is as a sequence of accessed resources and corresponding timestamps. User activity logs represented in this manner are referred to herein as Simple Logs (SLs). By way of example, an SL with length l can be denoted as $SL^l = ((r_1, t_1), \ldots, (r_l, t_l))$, $r_i \in R$.

Another possible representation of the user activity logs would record not only the resource and timestamp of an activity, but also the type of activity, e.g., opening and closing event. User activity logs represented in this manner are referred to herein as Classified Logs (CLs). As an example, if resource r is opened at time $t_1$ and closed at time $t_2$, the two activities may be denoted as $(r, t_1)$ and $(r, t_2)'$ respectively. In this example, it is assumed that all CLs are "complete." In other words, the resource must be closed in the logs as long as it has been opened at some earlier time. Clearly, a CL contains more information than an SL. When constructing the user activity model, the extra information in the CL can be used to optimize the model. However, some activity logging mechanisms may fail to detect the opening and closing events of a resource access. Therefore, the user activity log type is assumed to be SL unless otherwise specified.

The manner in which the system 100 processes user queries will now be described in greater detail. Assume a user submits a query q at time k of window W', and the user activity log in the previous window W is denoted as $SL_W = ((r_1 t_1)_W, \ldots, (r_{|W|}, t_{|W|})_W)$. The log in W' before time k is $SL_{W'}^k = ((r_1, t_1)_{W'}, \ldots, (r_k, t_k)_{W'})$. The goal of the context-aware search may be to rank all $r \in R$ by their relevance to the query q and the task $T_{W'}^{k+1}$. This process may include the following operations:

1. Find the model parameter $\lambda_W$ that best fits the observed log in W. In other words, find $\lambda_W$ that maximizes $p(\lambda|SL_W)$.

2. Given $\lambda_W$ and $SL_{W'}^k$, compute the task that the user is most likely in at time k+1, i.e., $T_{W'}^{k+1}$.

3. Given $T_{W'}^{k+1}$ and the query q, rank all $r \in R$ by their relevance to the query and the task $T_{W'}^{k+1}$.

Additional details associated with the performance of each of these query processing operations will be provided elsewhere herein. However, the manner in which the HMM is constructed in model generator 102 will first be described in greater detail.

As indicated previously, model construction in the FIG. 1 embodiment includes burst detection, burst refinement, burst-task mapping and task refinement, implemented in respective modules 110, 112, 114 and 116 of the model generator 102. The first three operations initialize the model parameters and the last operation attempts to optimize the parameters. These operations will be further described in separate sections below.

Burst Detection

The term "burst" in this embodiment refers to a time period which exhibits an increased level of user activities. It starts with a sharp increase in user activities and ends when the user activities return to a normal level. We have found that a burst of user activities usually indicates the start of a new task, and may also indicate a change in user classification such as location. Other types of bursts of user activity may be detected in other embodiments.

Figure 3:
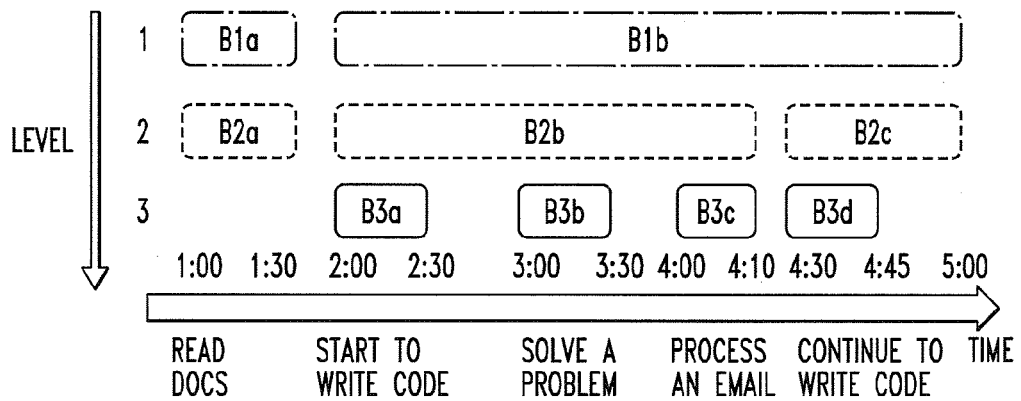
FIG. 3 illustrates exemplary bursts of tasks that may be detected in a burst detection module of the FIG. 1 system in generating a user model of the type shown in FIG. 2.

FIG. 3 shows an example illustrating the correspondence between bursts and tasks for the activities in one afternoon of a hypothetical researcher referred to as Mike. These activities are described in the following:

At 1 pm Mike started to do some investigation on Human-Computer Interaction by reading some papers and web pages. That was the first burst of his activities. At around 1:30 he felt tired so he took a nap. There were no user activities when he was asleep. Half an hour later he woke up and began to work on his demo program. He started his editor program and opened several documents for reference. At 2:30 he began to write code. He focused on programming so he opened fewer documents at that time. At 3 he found a problem with his system API. Therefore he searched his PC and read some documents. Finally the problem was solved at 3:30. At 4 Mike received an important email from his co-author, who found a problem in their paper. Mike had to pause in his current task.

He read the paper which was mentioned in his co-author's email and understood the problem. He remembered that the solution was in a web page. So he accessed the Internet and found that web page. Then he replied to his co-author at 4:10. After that Mike made himself a cup of coffee and had some relaxation time, so his activity level was reduced. Then Mike continued to write code. He started his editor program again and opened his source code. There were quite a few activities from 4:30 to 4:45. Finally he finished his coding job at 5.

In the above example, Mike conducted three primary tasks in that afternoon. The first one was the investigation on Human-Computer Interaction, which started at 1 and ended at 1:30. The second task was programming. This task started at 2 and was paused at 4. At 4:30 the programming task was resumed and finally finished at 5. The last task was replying to the email, which lasted from 4:00 to 4:10. Every time a new task is started or resumed, there is a burst of activities. A burst can be part of a task, or a complete task. The burst detection module 110 is configured to discover tasks from the stream of user activities.

The intensiveness threshold of a burst may greatly affect its length. The more intensive the activities are, the shorter the burst is. In the above example, assume that when Mike started to work on his program from 2 to 2:30, he opened 3 resources per minute. Further assume that as he was writing code from 2:30 to 3, he opened 1 resource per minute. If the threshold is 3 resources per minute, the burst is just half an hour (2-2:30). If the threshold of a burst is 1 resource per minute, the burst lasts much longer. Bursts may therefore be viewed as having different levels of intensiveness of user activity. Bursts of higher level are generated with lower threshold.

FIG. 3 also shows the different levels of bursts associated with the above-described activities of the user Mike. There are three levels of bursts in this example. Each rectangle represents a single burst of activities. The label of the rectangle represents the identity and the level of a burst. For example, the first burst of level 1 is denoted B1$a$, the second burst of level 3 is denoted B3$b$, and so on.

High-level bursts are covered by low level bursts in FIG. 3. For example, the burst B2$b$ of level 2 contains the bursts B3$a$, B3$b$ and B3$c$ of level 3. A low level burst may comprise multiple tasks. For example, in burst B2$b$ Mike was working on two tasks: programming and replying to the email. In higher levels, such as level 3, the activity log is separated into many short sequences of intense activities, in this case bursts B3$a$, B3$b$, B3$c$ and B3$d$. Other activities of level 3 are ignored. As a result, these low-level bursts only cover a limited number of desktop resources that are ever accessed by the user.

Figure 4:
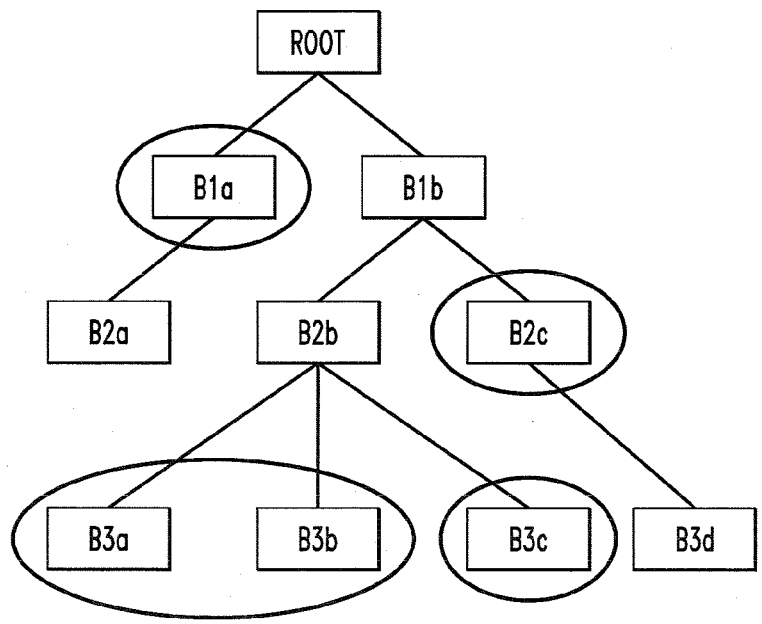
FIG. 4 illustrates the operation of a burst refinement module of the FIG. 1 system.

Since any high-level burst should be covered by one low-level burst, the bursts of different levels can be modeled with a tree structure, which is referred to herein as a "burst tree." FIG. 4 shows an example of a burst tree for the bursts of FIG. 3. If high-level burst a is covered by low-level burst b, b is said to be the parent a. Some tasks, such as the task of investigation, are low-level bursts (e.g., B2$a$). Some tasks, such as the task of replying to email, are high-level bursts (e.g., B3$c$). Other tasks, such as the task of programming, cover many bursts of different levels (e.g., B3$a$, B3$b$ and B2$c$). We therefore construct a burst tree with bursts of different levels as candidate tasks.

Burst detection is only the first step of building the user model. The next step is to analyze the bursts of different levels to find tasks.

Burst Refinement

The goal of the burst refinement is to cluster bursts by their related tasks. A cluster of bursts is referred to herein as a Candidate Task (CT). A CT in the present embodiment is a continuous period of time that covers one or multiple bursts of the same level. The user is supposed to work on just one task in a CT. Specifically, given a burst tree T, and where $n^l$ denotes a tree node n of level l in T, a CT of level l is defined as a set of $n^l$ that are continuous in time and are related to the same task.

Different CTs may be composed by bursts of different levels. Every leaf node in a burst tree can be treated as a CT according to the definition above. Then these CTs are clustered by their related tasks. After clustering, the set of CTs are refined. In the case of Mike, burst B3$a$ and B3$b$ form a CT of level 3. Burst B2$a$ forms a CT of level 2.

With reference again to the burst tree of FIG. 4, an ellipse indicates a CT. These CTs are from different levels. The higher the CT is, the more intensive the user activities are in that time period. These CTs obey the following rules:

1. Different CTs do not overlap in the timeline. In the burst tree of FIG. 4, if one tree node is marked as a CT, its descendants can no longer be CTs. In this embodiment it is assumed that a given user may switch between different tasks but cannot work on two tasks simultaneously.

2. The CTs and their descendants must cover all leaf nodes of the burst tree. This means that the user must be working on one or several tasks in a burst. The user cannot be just idling while performing many activities intensively.

3. A tree node is recognized as a CT if all of its descendants relate to the same task. In FIG. 4, if the user is working on one task in burst B3$d$, burst B2$c$ should be a CT because B3$d$ is its only descendant. Burst B2$b$ is not a CT because the user is supposed to work on two tasks in that burst.

The basic idea of burst refinement is to traverse the burst tree and identify the bursts of the same task. In the present embodiment we utilize an aggregation clustering technique which clusters objects in a bottom up way. Every leaf node is initially treated as a CT. Then if two CTs of the same level relate to the same task, they are merged. A simple algorithm may be used to detect the task of a CT. In most cases a task is bound with specific resources. Therefore, if most (e.g., 50%) of the resources in a CT are covered by another CT, they are assumed to belong to the same task.

A concern is that this merging strategy may be biased to larger CTs, i.e., CTs that cover more resources. Smaller CTs may be "devoured" by larger ones as a result of burst refinement. Accordingly, the larger CTs may grow bigger and bigger and "devour" more CTs. To prevent CTs from growing too fast, the merging threshold may be increased with the size of the larger one of the two CTs. Therefore, the threshold increases as well. An exemplary merging algorithm is as follows.

TABLE 1

An Example of a Burst Merging Algorithm

Name: MERGE
Input: CT $c_1$ and $c_2$ ; Average Size M ; Threshold δ
Output: YES or NO // Merge them or not
1     IF Size_of($c_2$) > Size_of($c_1$)
2        SWITCH($c_1$, $c_2$) // Make sure that $c_1$ is larger in size
3     $R_1$ = Resource_set_of($c_1$)
4     $R_2$ = Resource_set_of($c_2$)
5     IF (Size_of($c_1$)≤ A) // the size of $c_1$ is average
6        δ = 50%
7     ELSE
8        δ = 50% * Size_of($c_1$)/A
         //The threshold increases while the level decreases
9     IF (l ≥ 100%)
10    l = 100% // l is bounded with 0-1

TABLE 1-continued

An Example of a Burst Merging Algorithm

| | |
|---|---|
| 11 | IF COVERS($c_j$, $c_2$) ≥ 1 // $c_1$ covers most of resources of $c_2$ |
| 12 | OUTPUT YES |
| 13 | ELSE |
| 14 | OUTPUT NO |

An exemplary burst refinement algorithm that incorporates the burst merging algorithm of Table 1 is shown in Table 2 below. This burst refinement algorithm uses the following basic tree operations that are applied to a given node n of a burst tree T: Children(n) returns all the children of tree node n, Left_most(n) returns the left-most child of tree node n, and Right_sibling(n) returns the right sibling of tree node n if it exists and otherwise it returns the empty set φ.

TABLE 2

An Example of a Burst Refinement Algorithm

| | |
|---|---|
| | Name: Refine |
| | Input: Node n of Burst Tree T |
| | Output: Set of CTs CT |
| 1 | $n_1$=Left_most(n) |
| 2 | IF ($n_1$ = φ) |
| 3 | RETURN n // n is a leaf node |
| 4 | $n_2$=Right_sibling($n_1$) |
| 5 | OUT = φ // The output |
| 6 | WHILE ($n_2$ ≠ 0) DO |
| 7 | WHILE (Refine($n_1$) = {$n_1$} && Refine($n_2$) = {$n_2$}) |
| 8 | // The CTs of $n_1$ and $n_2$ respectively |
| 9 | OUT = OUT ∪ {{$n_1$},{$n_2$}} |
| 10 | IF MERGE($n_1$,$n_2$) = YES |
| 11 | OUT = OUT ∪ {$n_1$,$n_2$} − {{$n_1$},{$n_2$}} |
| 12 | $n_1$ = $n_2$ |
| 13 | $n_2$=Right_sibling($n_1$) |
| 14 | OUT = OUT ∪ {Refine($n_1$), Refine($n_2$)} |
| 15 | $n_1$ = $n_2$ |
| 16 | $n_2$=Right_sibling($n_1$) |
| 17 | IF (OUT = Children(n)) |
| 18 | OUT = {n} |
| 19 | OUTPUT OUT |

As shown in Table 2, the burst refinement algorithm iteratively calculates the CTs of a burst tree T. In the first step, the CTs of all the subtrees of T are output. Then some set of CTs are merged if the conditions are satisfied. Consider as an example the CTs in the burst tree of FIG. 4. The subtree B2*b* gets 3 CTs, i.e., B3*a*, B3*b* and B3*c*, in the iterative step. The first two of these are merged according to the burst merging algorithm of Table 1. Therefore the CTs of the subtree B2*b* are B3*a* and B3*b*, and B3*c*. As for the subtree B2*c*, it gets only one CT, i.e., B3*d*, in the iterative step. Because this is its only CT, the set of CTs of subtree B2*c* is B2*c*. The set of CTs of the root node of the tree is calculated in the same way.

Burst-Task Mapping

In the burst refinement step, the final output is the set of CTs. As mentioned above, a CT represents a consecutive length of time that the user works on a single task. However, two non-consecutive CTs may relate to the same task. Sometimes the user does switch back and forth between different tasks. The goal of the burst-task mapping is to merge two non-consecutive CTs which may relate to the same task.

The basic idea of the mapping step is similar to the burst refinement step. If two CTs share most of their resources, they may belong to the same task. The difference is that in the burst refinement step, only bursts of the same level are merged. The threshold decreases while the level of the bursts increases. In the mapping step, the CTs are of different levels.

Figure 5:
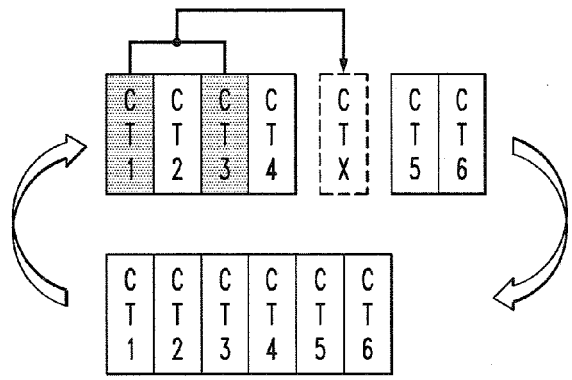
FIG. 5 illustrates the operation of a burst-task mapping module of the FIG. 1 system.

FIG. 5 shows an example of burst-task mapping. At the beginning, six CTs denoted CT1, CT2, CT3, CT4, CT5 and CT6 are ranked by their sizes. In the first iteration, the first element of the list, CT1, is compared with all other CTs of the list. It is determined that CT1 belongs to the same task as CT3 and so these two CTs are merged into CTX, which is inserted into what was the fifth place of the list according to its size. The merge algorithm of Table 1 is used to merge the two CTs. Afterwards CT1 and CT3 are removed from the list. In the second iteration, the first element of the list is compared with the other CTs of the list again. The burst-task mapping is completed when no CTs can be merged.

Task Refinement

After the burst-task mapping step, tasks are refined in the task refinement step. This latter step represents tasks as sets of resources. The probability that resource r is related to task t, i.e., p(r|t) can be approximately calculated as $$p(r|t)=n(r,t)/n(t)$$

where n(r, t) represents the number of occurrences of resource r in task t and n(t) is the total number of occurrences of all resources in task t.

With these probabilities, one can initialize the association matrix B of the HMM. By way of example, random or uniform initial estimates may be used for the transfer matrix A and the initial distribution π. More specifically, the transfer matrix A may be set to a random or uniform diagonal matrix, and the initial distribution π may be set to a random or uniform distribution. By running the Baum-Welch algorithm with the initial model λ=(T, R, π, A, B) and the observed resource sequence derived from the user activity log, a locally optimized HMM=λ'=(T, R, π, A', B') is obtained. Then, the optimized HMM can be used to provide the context-aware ranking for individual users as will now be described.

Context-Aware Ranking

In an exemplary context-aware ranking based on the above-described HMM, the top ranked items denote desktop resources that are most likely to be accessed by the given user at the very moment when the user submits the query. The "context" refers to activities the user performed in the time sliding window W. The size of W varies with different users. It can be a couple of days or just several hours. It is typically very rare that the user's current behavior is affected by his activities months ago.

The activities of the user in time window W are recorded as the inputs of the process comprising the above-described burst detection, burst refinement, burst-task mapping and task refinement steps. In this embodiment, it is assumed that the user model is not changed in the next sliding window W'. Therefore it is possible to predict the behavior of the user given the user log in W'. By way of example, further assume the model trained in W is denoted as $\lambda_W$ and $L_{w'}^k$ stands for an observed user activity sequence of length k in W'. By using the Viterbi algorithm, it is possible to get the corresponding task sequence $T_{W'}^k$ that maximizes $p(T_{W'}^k|\lambda_W, L_{W'}^k)$, i.e., the probability of the task sequence of length k given the model and the user log. As a result, the current task of the user, i.e., the k-th task in $T_{W'}^k$, can be estimated. When the user reaches the end of W', the model will be re-calculated by running the four-step process again with the log of W'.

The context-aware ranking may be implemented as follows. When the user submits query q after performing k activities in window W', the user model estimates his current task $t_{W'}^k$ as mentioned above. Then the next task $t_{W'}^{k+1}$ can be predicted with the transfer matrix A of $\lambda_W$. The next step is to get the probability that resource r is related to the (k+1)-th task, i.e., $p(r|t_{W'}^{k+1})$, from the matrix B of $\lambda_W$. This probability is used to rank the result sets with the conventional similarity score. To balance the impact of the access probability and similarity score, a balancing parameter α is used. The final rank score F(r, q) of resource r to the query q is computed as follows:

$$F(r,q) = \alpha * p(r|t_W^{k+1}) + (1-\alpha) * s(r,q)$$

Here s(r, q) represents the cosine similarity score, and α is between 0 and 1. If α is set to 1, the results are only ranked by their probability scores. If α is set to 0, they are only ranked by the similarity scores. In other cases, both scores are used. As a default setting, a value of α=0.5 may be used. We have generally found that in certain embodiments, as α is increased above the default setting, the precision is significantly improved and the recall is also slightly improved as well. This indicates that the context-aware ranking is more effective in "guessing" the real needs of the user.

When the user submits a query, the system first retrieves desktop resources containing at least some of the query terms from the local full-text index. The result set is then ranked by the number of words the resource contains, denoted as $R=(r_1, r_2, \ldots, r_p)$. Assume the user is working on task $t_W^k$. One possible implementation of the context-aware ranking algorithm may operate as follows:

TABLE 3

An Example of a Context-Aware Ranking Algorithm

Name: Context-aware Ranking
Input: HMM $\lambda_W$, user log $L_W^k$, balancing parameter ε, result set R = ($r_1, r_2, \ldots, r_p$)
Output: Ranked list R'
1    Compute $t_W^{k+1}$ // The next task after the user submits the query
2    FOR i=1 TO p
3        Compute $p(r_i | t_W^{k+1})$
4    $p_{min} = \text{Min}(p(r_i | t_W^{k+1}))$
5    FOR i=1 TO p
6        IF $p(r_i | t_W^{k+1}) == 0$ //Some resources are not related
7            $p(r_i | t_W^{k+1}) = p_{min}$ // Smoothing
8        $F(r_i,q) = p(r_i | t_W^{i+1}) * s(r_i,q)^\varepsilon$
9    Normalize( $F(r_i,q)$)//Make sure that $\Sigma_i F(r_i,q) = 1$
10   Rank R' by $F(r_i,q)$
11   OUTPUT R'

The algorithm in Table 3 runs during the query. It might slightly increase the response time. But the delay can be minimized by controlling p. For example, p may be set to 10. In other words, only the top 10 results will be re-ranked when the user submits the query. They are shown in the first page of the result set. The next 10 results may be re-ranked when the user clicks a "next page" button.

A number of implementation issues arising in certain of the embodiments described above will now be addressed in greater detail.

Window Size

As mentioned above, the user model may be built on activities in a time sliding window. The behavior of the user in window W is estimated by the model trained from the previous window W'. This is based on the observation that a user's behavior is mainly subject to recent activities. Early activities typically have limited direct effect on his recent behavior. The length of the window may affect the ranking result. Generally speaking, the more complex the user's task is, the longer the window should be. For example, when the user is writing a doctoral thesis, the user might frequently read documents written weeks ago. In this case the size of the window should be larger. Usually desktop users tend to read documents that are read or written in the past few days.

The window size can have other impacts. For example, the model is typically updated when the window is coming to an end. If the window size is too small, the model will be updated frequently, which may affect the user experience. In a typical embodiment, it may only take a couple of minutes to update the model given a log of one day. The cost increases with the window size and the number of resources being opened. The model can be updated when the desktop is not heavily loaded, e.g., at lunch time or at midnight.

The window size may also be affected by the user's habits. Some users do not like to do one task continuously. They prefer to switch between different tasks. The window size should be larger for these users.

Classified Logs

The examples described above are based on SLs, which do not contain the "opening" and "closing" events of resources. The extra information in CLs can be used to improve the performance of the context-aware search in two ways.

First, the extra information in CLs can be used to refine bursts. Sometimes a burst may comprise multiple tasks. In the burst refinement step, bursts of different levels are transformed into CTs. However, if a burst of the highest level contains multiple tasks, it is impossible to separate the burst into several CTs. CLs may solve this problem. We have observed that when all opened resources are closed, or when a significant change to the user classification occurs, such as the user moving to a new location, the current task is probably completed and a new task is probably about to begin. Following this observation, it is possible to find the end of a CT inside a burst.

Second, the extra information in CLs can improve the effectiveness of the merging algorithm in Table 1, which is used to merge similar CTs. In the case of SLs, two CTs are merged if they cover similar resources. Sometimes this condition is too strong. For instance, when a researcher is writing a paper, the researcher may refer to different resources. The researcher's activities relating to the task of writing the paper are distributed in two bursts: the beginning and the end of the writing. The two bursts are unlikely to be merged because most of their resources are different. The problem of the merging strategy is that not all resources should be taken into consideration. We have observed that the longer a resource is opened, the more important it might be. It is reasonable because the opened resource attracts more attention from the user than other ones. In the above case, the paper is the most important resource for both bursts. Based on this observation, the merging strategy can be changed to the following: if the most important resources of two bursts are the same, these two bursts should be merged.

Transfer Matrix A and Initial Probability Vector π

As mentioned previously, it is reasonable to use either random or uniform initial estimates of the transfer matrix A and the initial probability vector π. However, the user model is updated when the sliding window is finished. It is possible to use the optimized model parameters in the first window as the initial estimates of the next window. Suppose W and W' are two consecutive windows. Before the task refinement step, the initial estimates of model parameters in W are denoted as $\lambda_W(T, R, \pi_W, A_W, B_W)$. After the task refinement step, the model parameters are $\lambda'_W(T, R, \pi'_W, A'_W, B'_W)$. $B_W$ is the output of the burst-task mapping step. $A_W$ is a diagonal matrix and $\pi_W$ is a uniform vector. The optimized values of A and π in window W can be used as initial estimates in window W', i.e.

$$A_W = A'_W$$

$$\pi_W = \pi'_W$$

Other exemplary systems implementing aspects of the invention will now be described in greater detail.

Figure 6:
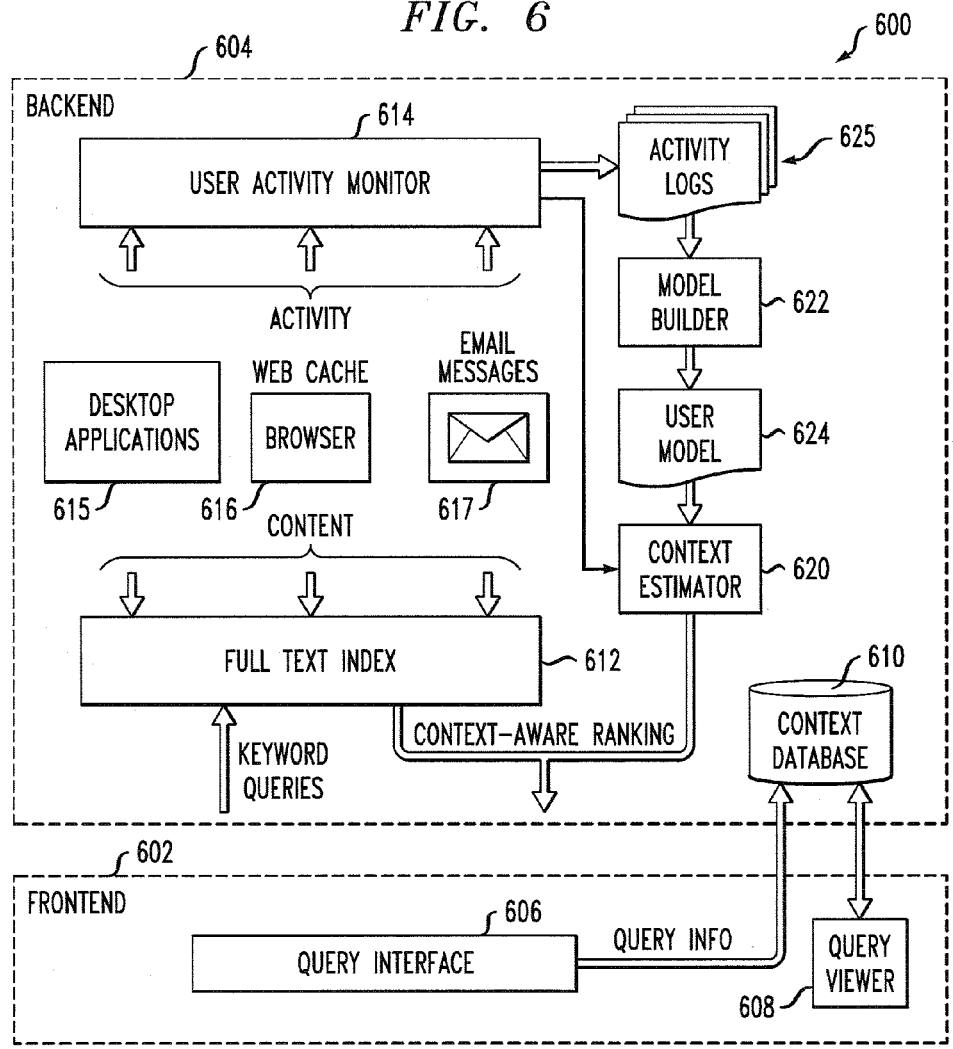
FIG. 6 is a block diagram of a personal computer system implementing context-aware search.

FIG. 6 shows another embodiment of an information processing system 600 implementing context-aware search techniques. In this embodiment, the techniques are implemented on a personal computer, such as a desktop personal computer, but are configured using the same general context-aware search framework previously described in conjunction with FIG. 1. The system 600 comprises a frontend portion 602 and a backend portion 604, with each such portion comprising multiple processing modules. In the frontend portion 602, a user enters keyword queries via a query interface 606, and can check his query and associated context in a query viewer 608. The query viewer may run in two modes, an online mode and an offline mode. In the online mode, the query viewer gets the query context directly from a memory cache, not explicitly shown, which may include, for example, query information, task context and related resources, user classifications, query scores and context scores, as well as clickthrough data of each query. In the offline mode, the query viewer can retrieve this information from a context database 610.

The backend portion 604 includes a full text index module 612 and a user activity monitor 614. Content associated with desktop resources such as applications 615, browser web cache 616 and email messages 617 is indexed by the full text index module 612, which may comprise a conventional module such as Lucene. The full text index module is also responsible for generating search results with ranking scores for each query. The user activity monitor 614 collects all user activities from the indexed content. These activities are used synchronously by a context estimator 620 and asynchronously by a model builder 622 which generates a user model 624. The latest activities are cached in memory for current task context and are flushed to activity logs 625 periodically or when the system is closed. The user activity monitor 614 can track both system-level and application-level activities. System-level activities include all file system operations such as creating or deleting a file. There may be different types of application-level activities (e.g., click a web page) and these may be collected using application plug-ins.

The model builder 622 analyzes the user activity logs 622 and produces the user model 624 in the manner previously described. The context estimator 620 computes the possible user context of each query according to the user model, any available user classifications, and the user's recent activities at the query time. By combining the context score from the context estimator and the query score from the full text index module, the system 600 is able to generate the user context-aware ranking results, which are most relevant to the current status of the user.

Another aspect of the invention relates to implementing context-aware search techniques, such as those described above, in a network cloud. An embodiment of this type will now be described with reference to FIGS. 7 through 9. This embodiment provides what is referred to herein as Personalization as a Service (PaaS), with the personalization being implemented within the cloud.

Figure 7:
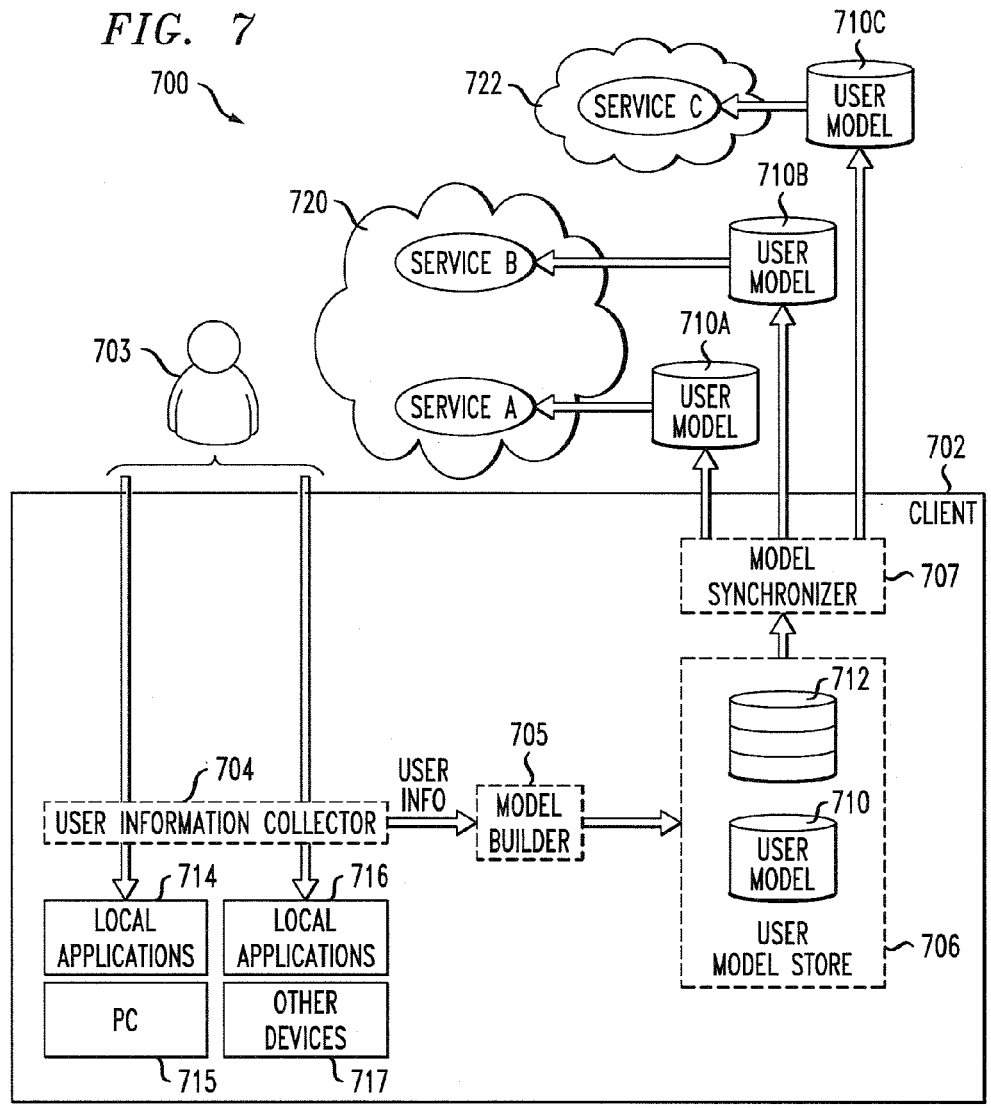
FIG. 7 is a block diagram showing an illustrative embodiment of an information processing system with context-aware search implemented in a network cloud.

Referring now to FIG. 7, an information processing system 700 comprises a client 702 associated with a particular user 703. The client comprises a number of modules including a user information collector 704, a model builder 705, a user model store 706, and a model synchronizer 707.

In the system 700, a model 710 of the user 703 is computed by the model builder 705 at regular intervals, referred to as update cycles, based on user information gathered by the user information collector 704. A number of different versions 712 of the model 710 may be generated, such as one version for each of the update cycles. The user information on which the model 710 and its various versions 712 are based may include, for example, information associated with local applications 714 running on a personal computer (PC) 715 as well as information associated with local applications 716 running on one or more other devices 717 of the user 703. The current user model 710 generated by model builder 705 and any other versions 712 of that model are stored in the user model store 706.

The client 702 or elements thereof such as PC 715 or other devices 717 may be viewed as examples of what are more generally referred to herein as "processing devices." A given such device generally comprises at least one processor and an associated memory, and implements functional modules for controlling some aspects of the context-aware search functionality of the system 700.

Also included in the system 700 are cloud service providers of respective cloud services denoted as Service A, Service B and Service C. Services A and B are part of a network 720, and Service C is part of a network 722. The networks 720 and 720 may each comprise a wide area network (WAN), a local area network (LAN), a satellite network, a telephone or cable network, or various portions or combinations of these and other types of networks, in any combination. The model synchronizer 707 can provide an appropriate version of the user model 710 to each of the Services A, B and C as indicated generally at 710A, 710B and 710C, respectively. Thus, the same general user model 710 constructed by client 702 can be shared by all of the cloud services, thereby allowing the user to have the same personalized context-aware search experience with each such service. System performance and efficiency are improved because each cloud service is not burdened with the costs of constructing and updating a distinct model for each of their users.

Additional details regarding the user information collector 704, model builder 705, user model store 706 and model synchronizer 707 will now be described.

The user information collector 704 generally gathers all pertinent information regarding the user 703 and his activities within the system. This user information may include, for example, topics of interest selected by the user from predefined templates, explicit user feedback such as tags assigned to documents by the user, implicit feedback including logs associated with file access, email and messaging, any documents written or read by the user and the associated content of such documents.

As indicated above, the model builder 705 computes a user model 710 in every update cycle. Each such user model may have an associated timestamp indicating when it was created, and these timestamps may serve as an index of the various versions 712 of the models stored in the user model store 706. The user models may comprise respective HMMs generated in the manner described elsewhere herein. Different types of user models may be provided to each of the different cloud service providers, as illustrated by elements 710A, 710B and 710C in the figure, depending on the particular service to be provided. Indices other than timestamps could be used to identify particular ones of the model versions 712 in the user model store 706. Examples of alternative indices suitable for identifying different model versions may include documents accessed, important keywords, special events, etc.

The model synchronizer 707 sends user models 707A, 707B and 707C to the respective cloud services A, B and C implemented in networks 720 and 722. It can provide functionality such as privacy control, allowing the user to designate which user models if any may be made accessible to the respective cloud services. The model synchronizer 707 can use standard query language to retrieve models from the user model store 712. For example, if the store is a relational database system, it may use SQL. The model synchronizer also handles all of the connections with remote servers of the networks 720 and 722. It may be configured to support multiple protocols such as TCP/IP, sockets, web services, etc. The model synchronizer allows the model generation and storage processes of the client 702 to be independent of the various types of cloud services.

Figure 8:
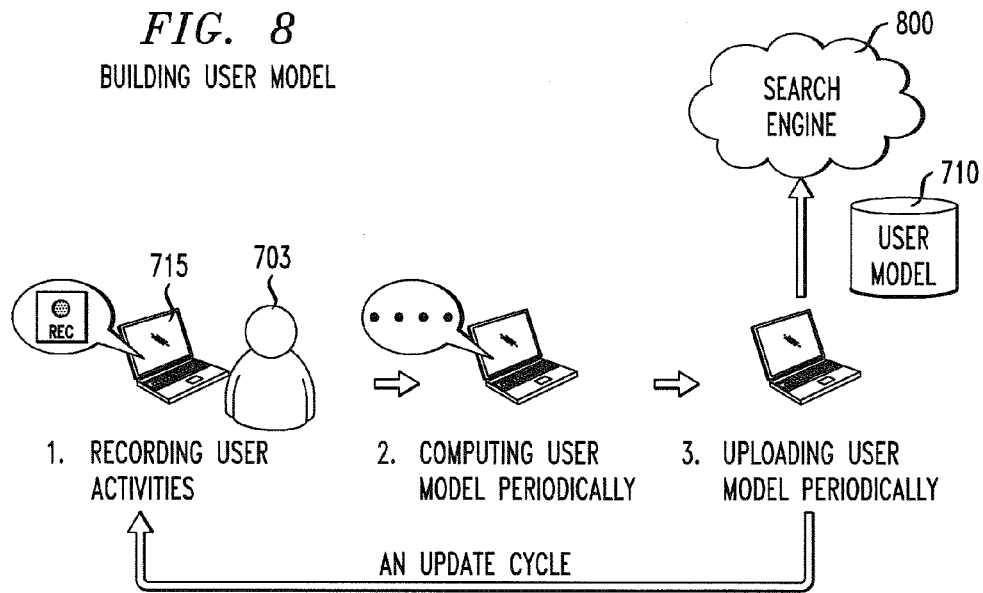
FIG. 8 is a diagram of a process for building a user model in the FIG. 7 system.
Figure 9:
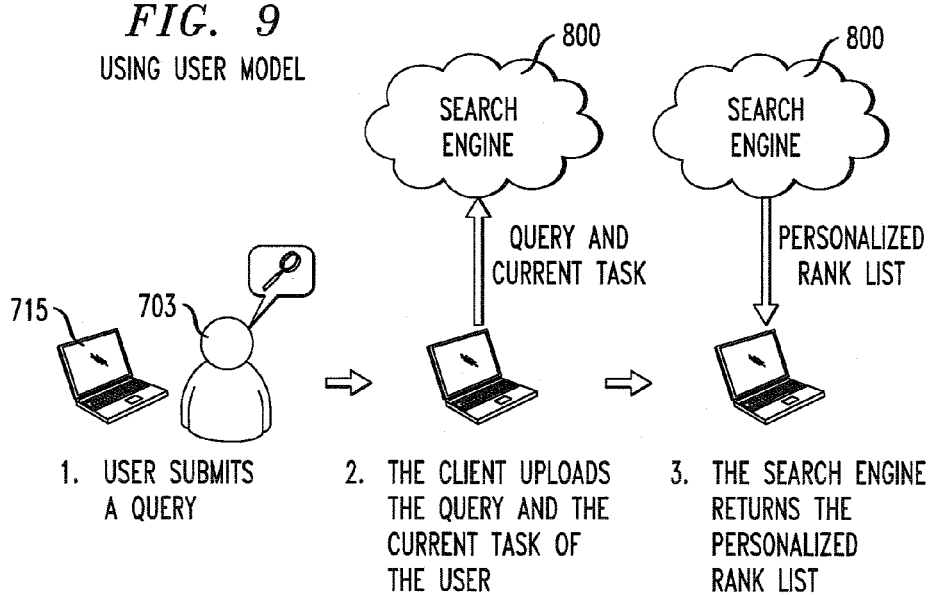
FIG. 9 is a diagram of a process for utilizing a user model in the FIG. 7 system.

FIGS. 8 and 9 illustrate respective processes for building and utilization of a user model in the system 700 of FIG. 7. With reference initially to FIG. 8, activities of the user 703 at PC 715 are recorded by the user information collector 704, and a corresponding user model 710 is computed periodically by the model builder 705. The user model may then be periodically uploaded to a search engine implemented in cloud 800 as indicated. As shown in FIG. 9, when the user 703 submits a search query, the client uploads the query and the current task of the user to the search engine of cloud 800. The search engine then returns a personalized rank list to the client 702.

The personalized rank list may be based on a combination of a similarity score for the resource and a relevance score. For example, a score S of a document in the result list may be given by $$S = \alpha * \text{Relevance\_Score} + (1-\alpha) * \text{Similarity\_Score}.$$

The similarity score indicates how this resource is related to the query, and the relevance score indicates how this resource is related to the current task of the user. In this way the user can determine the resource which is most relevant to his current status.

Figure 10:
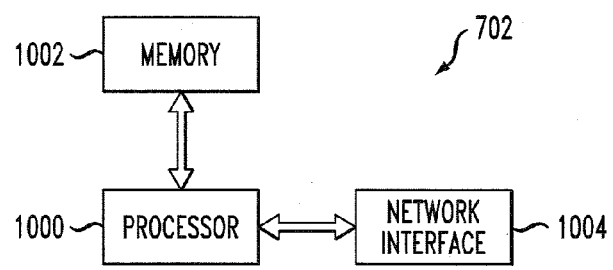
FIG. 10 shows one possible implementation of a processing device of the FIG. 7 system.

FIG. 10 shows one possible implementation of at least a portion of client 702 or another processing device of system 700. The client 702 in this embodiment comprises a processor 1000 coupled to a memory 1002 and to network interface circuitry 1004. The processor 1000 may comprise a microprocessor, a microcontroller, an application-specific integrated circuit (ASIC), a field programmable gate array (FPGA) or other type of processing circuitry, as well as portions or combinations of such circuitry elements. Modules such as modules 110, 112, 114 and 116 of FIG. 1 or modules 704, 705, 706 and 707 of FIG. 7 may be implemented in whole or in part in the form of one or more software programs stored in memory 1002 and executed by processor 1000.

The memory 1002 may be viewed as an example of what is more generally referred to herein as a "computer program product" having executable computer program code embodied therein. Such memories may comprise electronic memories such as random access memory (RAM), read-only memory (ROM) or other types of memory, in any combination. The computer program code when executed in a processing device implementing context-aware search causes the device to perform corresponding operations associated with functions such as user activity monitoring and user model generation. One skilled in the art would be readily able to implement such software given the teachings provided herein. Other examples of computer program products embodying aspects of the invention may include, for example, optical or magnetic disks.

The network interface circuitry 1004 may comprise a transceiver for communicating with other processing devices over a network.

It is to be appreciated that the particular arrangements of system and device components shown in FIGS. 1 and 6-10 are presented by way of illustrative example only, and numerous alternative arrangements of clients, servers, networks, processors, memories, interface circuitry or other components may be used to implement an information processing system in accordance with the invention.

It should be noted that alternative embodiments of the invention may use multiple user activity logs of different types. For example, the above-described CLs may be supplemented with another type of user activity log that incorporates information regarding the location and movements of the user. Such an arrangement would allow other types of context to be considered in the context-aware search process, possibly by allowing burst detection to depend not just on an increase of user activities, but also on a change of location. More generally, a user activity log may be configured to indicate a user entering and/or leaving any particular state that may be of interest in characterizing the user.

Other embodiments may derive one or more "user classifications" and "user interest classifications" based on the resources accessed and the tasks carried out. These classifications could then be considered in setting window size, ranking search results, or performing other steps in a context-aware search process. As one example, the above-noted score S of a document in the result list may be modified as follows:

$$S = \sum_i (\alpha_i * \text{Relevance\_Score\_i}) + \left(1 - \sum_i (\alpha_i)\right) * \text{Similarity\_Score}$$

where the values $\alpha_i$ and Relevance_Score_i are associated with an i-th one of the different classifications. As another example, the "user classifications" or "user interest classifications" may be used to route queries to specific network clouds based on similar classifications of cloud contents.

In these and other embodiments which utilize one or more classifications, there may be multiple classification schemes associated with the system users. For example, a given classification may comprise an assignment of a single class name with respect to a corresponding classification scheme. A classification scheme may comprise a set of mutually-exclusive class names and will also typically include a definition of when they are applicable, or how they are to be calculated. Examples of different classification schemes for users include user location, user role in the company, etc.

It should again be emphasized that the above-described embodiments of the invention are presented for purposes of illustration only. Many variations and other alternative embodiments may be used. For example, although described in the context of particular system and device configurations, the techniques are applicable to a wide variety of other types of information processing systems and processing devices. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
    detecting bursts of activity associated with a particular user, wherein a given one of the bursts of activity is indicated by an increased level of activity of the particular user above a threshold level of activity of that particular user and wherein the given one of the bursts of activity comprises one or more of opening, modifying and closing a local resource of a computing device associated with the particular user;
    mapping the bursts to tasks performed by the particular user;

generating a user model specific to the particular user based on the mapping of bursts to tasks, wherein the user model comprises a Hidden Markov Model and generating the user model comprises generating a first version of the user model and generating a second version of the user model, the first version of the user model being associated with a first set of services and the second version of the user model being associated with a second set of services, the first set of services being different than the second set of services; and providing personalized query processing to the particular user based on the user model;

wherein providing personalized query processing comprises:

receiving one or more queries from the particular user;

sending the one or more queries and at least one of the first and second versions of the user model to one or more cloud service providers selected from a plurality of cloud service providers, wherein the one or more cloud service providers are selected based at least in part on one or more user classifications associated with the particular user, the one or more user classifications comprising at least one of a classification based on a role of the particular user in a given entity and a classification based on a location of the particular user; and providing ranked search results from the one or more cloud service providers to the particular user responsive to the one or more queries and the at least one of the first and second versions of the user model.

2. The method of claim 1 wherein the Hidden Markov Model is of the form $\lambda=(T, R, \pi, A, B)$, in which T and R are sets of tasks and resources respectively, $\pi$ is an initial probability vector of tasks, A is a transformation matrix of tasks and B is an association matrix between tasks and resources.

3. The method of claim 1 wherein detecting bursts of activity further comprises detecting said bursts by processing user activity logs.

4. The method of claim 3 wherein at least one of the user activity logs is of the form $SL^l=((r_1, t_1), \ldots, (r_l, t_l))$, where $r_i \in R$ denotes a resource, $t_i$ denotes a timestamp, and l denotes a length of the log.

5. The method of claim 3 wherein at least one of the user activity logs comprises two activities represented in the form $(r, t_1)$ and $(r, t_2)'$ to respectively denote a resource r being opened at time $t_1$ and closed at time $t_2$.

6. The method of claim 3 wherein at least one of the user activity logs indicates at least one of entering and leaving a particular state that is associated with assignment of at least one user classification.

7. The method of claim 1 wherein mapping bursts to tasks further comprises generating a burst tree T, where $n^l$ denotes a tree node n of level l in T, and defining a candidate task of level l as a set of $n^l$ that are continuous in time and are related to the same task.

8. The method of claim 7 further comprising the steps of:

merging two different candidate tasks of one level of the burst tree into a single candidate task; and merging a first candidate task of one level of the burst tree with another candidate task of another level of the burst tree.

9. The method of claim 1 wherein providing personalized query processing to the user based on the user model further comprises utilizing the user model to determine a particular manner in which the one or more queries will be processed.

10. The method of claim 1 wherein providing personalized query processing to the user based on the user model further comprises utilizing the user model to rank the search results for presentation to the user.

11. The method of claim 10 further comprising:

receiving a given query from the user in a current time window;

obtaining a model parameter;

based on the model parameter, identifying a most likely task for the user in the current time window; and based on the given query and the most likely task, ranking the search results for presentation to the user.

12. The method of claim 11 wherein the model parameter is generated as a model parameter that best fits an observed activity log from a previous time window.

13. The method of claim 1 wherein sending the user model to the one or more cloud service providers comprises communicating the user model to the one or more cloud service providers over a network.

14. The method of claim 13 further comprising receiving the ranked search results from the one or more cloud service providers, the ranked search results being determined by the cloud service provider based on the user model.

15. A computer program product comprising a non-transitory processor-readable storage medium having encoded therein executable code of one or more software programs, wherein the one or more software programs when executed by a processor of a processing device implement the method of claim 1.

16. An apparatus comprising:

a processing device having a processor coupled to a memory;

wherein the processing device is configured detect bursts of activity associated with a particular user, to map the bursts to tasks performed by the particular user, to generate a user model specific to the particular user based on the mapping of bursts to tasks, and to provide personalized query processing to the particular user based on the user model;

wherein a given one of the bursts of activity is indicated by an increased level of activity of the particular user above a threshold level of activity of that particular user;

wherein the given one of the bursts of activity comprises one or more of opening, modifying and closing a local resource of a computing device associated with the particular user;

wherein the user model comprises a Hidden Markov Model;

wherein the processing device is further configured to generate the user model by generating a first version of the user model and generating a second version of the user model, the first version of the user model being associated with a first set of services and the second version of the user model being associated with a second set of services, the first set of services being different than the second set of services; and wherein the processing device is further configured to provide personalized query processing by:

receiving one or more queries from the particular user;

sending the one or more queries and at least one of the first and second versions of the user model to one or more cloud service providers selected from a plurality of cloud service providers, wherein the one or more cloud service providers are selected based at least in part on one or more user classifications associated with the particular user, the one or more user classifications comprising at least one of a classification based on a role of the particular user in a given entity and a classification based on a location of the particular user; and providing ranked search results from the one or more cloud service providers to the particular user responsive to the one or more queries and the at least one of the first and second versions of the user model.

17. The apparatus of claim 16 wherein the processing device is configured to send the user model to the one or more cloud service providers by communicating the user model to the one or more cloud service providers over a network.

18. The apparatus of claim 16 wherein the processing device is configured to receive the ranked search results from the one or more cloud service providers, the ranked search results determined by the cloud service provider based on the user model.

19. The apparatus of claim 16 wherein the processing device is configured to generate said one or more user classifications based on resources accessed by the user and the tasks performed by the user, and to provide the personalized query processing to the user based on the user model and said one or more user classifications.

20. The apparatus of claim 19 wherein the processing device is configured to route a given one of the queries to a particular one of the plurality of cloud service providers based on said one or more user classifications.

21. The method of claim 1, wherein the local resource comprises a file.

22. The method of claim 1, wherein the local resource comprises an application.

23. The method of claim 1, wherein providing personalized query processing comprises sending the first version of the user model to a first one of the plurality of cloud service providers and sending the second version of the user model to a second one of the plurality of cloud service providers.

* * * * *